United States Patent
Krishnaswamy et al.

(10) Patent No.: US 9,317,965 B2
(45) Date of Patent: Apr. 19, 2016

(54) UNIFORM POINT CLOUD DECIMATION

(75) Inventors: Ravinder P. Krishnaswamy, San Francisco, CA (US); Jeffrey M. Kowalski, Berkeley, CA (US); Carl Christer Janson, San Rafael, CA (US)

(73) Assignee: Autodesk, Inc., San Rafael, CA (US)

( * ) Notice: Subject to any disclaimer, the term of this patent is extended or adjusted under 35 U.S.C. 154(b) by 301 days.

(21) Appl. No.: 13/071,130

(22) Filed: Mar. 24, 2011

(65) Prior Publication Data
US 2012/0246166 A1 Sep. 27, 2012

(51) Int. Cl.
*G06F 17/30* (2006.01)
*G06T 17/00* (2006.01)
*G06T 9/00* (2006.01)

(52) U.S. Cl.
CPC .......... *G06T 17/00* (2013.01); *G06F 17/30241* (2013.01); *G06T 9/00* (2013.01); *G06F 17/3028* (2013.01); *G06F 2217/16* (2013.01); *G06T 2210/56* (2013.01)

(58) Field of Classification Search
CPC ........ G06T 17/00; G06T 17/20; G06T 15/00; G06T 15/08; G06T 15/205; G06T 2207/10028; G06T 7/00; G01S 17/89; G01S 17/42; G06F 17/30241; G06F 17/3028; G06F 17/50; G06F 17/5009; G06F 17/5018; G06F 2217/16
USPC ............. 707/1, 100, 741, 745, 754, 763, 798; 345/419, 420, 606
See application file for complete search history.

(56) References Cited

U.S. PATENT DOCUMENTS

| | | | |
|---|---|---|---|
| 7,003,136 B1 * | 2/2006 | Harville | 382/103 |
| 7,215,810 B2 * | 5/2007 | Kaufmann et al. | 382/154 |
| 7,373,473 B2 * | 5/2008 | Bukowski et al. | 711/170 |
| 7,420,555 B1 * | 9/2008 | Lee | 345/424 |
| 7,804,498 B1 * | 9/2010 | Graham et al. | 345/419 |
| 7,831,087 B2 * | 11/2010 | Harville | 382/154 |
| 7,921,002 B2 * | 4/2011 | Kamatsuchi | 703/9 |
| 8,022,951 B2 * | 9/2011 | Zhirkov et al. | 345/427 |
| 8,045,762 B2 * | 10/2011 | Otani et al. | 382/109 |
| 8,179,393 B2 * | 5/2012 | Minear et al. | 345/419 |
| 8,290,305 B2 * | 10/2012 | Minear et al. | 382/294 |
| 8,427,472 B2 * | 4/2013 | Moravec | 345/420 |
| 8,452,078 B2 * | 5/2013 | Prokhorov | 382/154 |
| 8,525,848 B2 | 9/2013 | Janson | |

(Continued)

OTHER PUBLICATIONS

K. Wurm, A. Hornung, M. Bennewitz, C.I Stachniss, W. Burgard, "OctoMap: A Probabilistic, Flexible, and Compact 3D Map Representation for Robotic Systems". "Proc. of the ICRA 2010 Workshop on Best Practice in 3D Perception and Modeling for Mobile Manipulation", Published May 2010.*

(Continued)

*Primary Examiner* — Dangelino Gortayo
(74) *Attorney, Agent, or Firm* — Gates & Cooper LLP

(57) ABSTRACT

A method, apparatus, system, article of manufacture, and computer readable medium provide the ability to create a point cloud indexed file. A grid (of cells that are divided into subcells) is mapped over points in a point cloud dataset. An occupancy value, that indicates whether a subcell contains a point, is computed for each subcell. A surface area contribution factor is computed for each cell and identifies a count of subcells that are occupied divided by a total number of subcells. The surface area contribution factor for each cell and points for each cell are written to the point cloud indexed file.

21 Claims, 12 Drawing Sheets

(56) References Cited

U.S. PATENT DOCUMENTS

| | | | |
|---|---|---|---|
| 8,553,989 B1* | 10/2013 | Owechko et al. | 382/224 |
| 2005/0203930 A1 | 9/2005 | Bukowski et al. | |
| 2006/0290695 A1 | 12/2006 | Salomie | |
| 2009/0060345 A1* | 3/2009 | Wheeler et al. | 382/195 |
| 2010/0172567 A1 | 7/2010 | Prokoski | |
| 2010/0201682 A1 | 8/2010 | Quan et al. | |
| 2011/0202538 A1* | 8/2011 | Salemann | 707/741 |
| 2011/0210971 A1* | 9/2011 | Palais et al. | 345/420 |
| 2011/0310088 A1* | 12/2011 | Adabala et al. | 345/419 |

OTHER PUBLICATIONS

PCT International Search Report and Written Opinion dated Jul. 3, 2012, International Application No. PCT/US2012/030300.

Du, Zhiqiang, et al., "A New Method of Storage and Visualization for Massive Point Cloud Dataset", 22nd CIPA Symposium, Oct. 11-15, 2009, Kyoto, Japan.

Huang, Hui, et al., "Consolidation of Unorganized Point Clouds for Surface Reconstruction", ACM SIGGRAPH Asia 2009, Article No. 176, 10.1145/1661412.1618522.

Manson, J., et al., "Streaming Surface Reconstruction Using Wavelets", Eurographics Symposium on Geometry Processing 2008, Pierre Alliez and Szymon Rusinkiewicz (Guest Editors), vol. 27 (2008), No. 5.

Morales, R., et al., "Unstructured Point Cloud Surface Denoising and Decimation Using Distance RBF K-Nearest Neighbor Kernel", Advances in Multimedia Information Processing, Lecture Notes in Computer Science, G. Qiu et al. (Eds.): PCM 2010, Part II, LNCS 6298, pp. 214-225, 2010.

* cited by examiner

UNIFORM POINT CLOUD DECIMATION

CROSS-REFERENCE TO RELATED APPLICATIONS

This application is related to the following co-pending and commonly-assigned U.S. patent application(s), which is/are incorporated by reference herein:

U.S. patent application Ser. No. 12/619,490, filed Nov. 16, 2009, by Carl Christer Janson, entitled "Point Cloud Decimation Engine."

BACKGROUND OF THE INVENTION

1. Field of the Invention

The present invention relates generally to visualizing data points, and in particular, to a method, apparatus, and article of manufacture for normalizing a view of large point cloud data.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Point clouds are often created by reality capture devices such as laser three-dimensional (3D) scanners that measure a large number of points (e.g., from thousands to many billions of points [3D coordinates]) on the surface of an object, and output a point cloud as a data file. The point cloud represents the visible surface of the object that has been scanned or digitized. With the increase usage of such reality capture devices, large point cloud data sets are more frequently created for consumption by design applications. The challenge that design software faces is visualizing and using this data efficiently in the applications. While the point cloud data set is often very large, the number of points an application is capable of handling for visualization and other needs is a small fraction—a few million points, for example. Prior art methods fail to provide the ability to process the massive volume of points, in real time (e.g., preserving a ten [10] frames per second or faster rate) to read a small fraction of points that have the property of accurately representing the original data set without loss of detail or information that causes misrepresentation of the original data. Such problems may be better understood with a detailed description of prior art point cloud processing and viewing methodologies.

Point cloud visualization and applications are increasingly important in design, especially due to the decrease in the price point of the technology. Point clouds can contain an enormous number of points. One of the major challenges is representing the set of points while providing the ability to extract a small subset that is highly representative of the spatial region of interest.

As described above, a point cloud is created using a laser beam/scanner that scans objects/surfaces to obtain millions of points. Prior art methodologies may attempt to select a subset of the points in a quick and efficient manner. One approach divides a volume of interest into equal size rectangular 3D cells. Each of the thousands of cells may contain millions of points. The issue arises as to how to determine how many and which points to select from/in a cell. In the prior art, the total number of points in a cell may be compared to the total number of points in other cells. These relative totals are then used to determine how many points to select from each cell. Thereafter, points are merely read in the order in which they are stored in memory. Point sample density falls off as the square of the distance from the scanner, since the scan process can be viewed as emitting rays radially from the scanner location. Thus, the further an object/surface lies from the optics source, the sparser the sampled points are.

Accordingly, there is a desire to eliminate the scanner artifact, to normalize the point selection, and to obtain a uniform distribution/real depiction of the distribution of the point cloud data regardless of the location of the scanner. Many prior art approaches have attempted to solve such problems. Such approaches range from nearest neighbor based approaches [1] to frequency domain based approaches [4]. Concepts of downsampling, borrowed from image processing techniques have also been incorporated in solutions to view large point data sets [2]. Goals of some techniques include noise removal and optimal representation, at the expense of computation and with freedom to modify the original point set [3].

Another prior art based solution (e.g., AutoCAD™ PCG™ available from the assignee of the present invention) referred to as a point cloud decimation engine (which is described in copending U.S. patent application Ser. No. 12/619,490, filed Nov. 16, 2009, which application is incorporated by reference herein), while maintaining really good frame rates, may have issues with a "halo" effect around the scanners, since the indexing scheme uses the count of points within a cell to determine the relative point contribution from the cell. In this regard, FIGS. 1A and 1B illustrate the halo effect caused by prior art solutions. In FIG. 1A, the "S" indicates the location of the scanner device. As illustrated, an object/surface on a plane (r) close to the scanner S will have more points scanned compared to that of an object laying on a plane (3r) located a further distance from the scanner S. FIG. 1B illustrates a "halo" with a dense pattern of points for the object in close proximity to the scanner/light source.

However, to provide a practical approach, an industrial strength and simple solution is paramount, with a clear demonstration of uniformity of display for a wide class of customer data sets.

SUMMARY OF THE INVENTION

Embodiments of the invention achieve uniform point cloud decimation through relative surface area contribution estimation by the introduction of the notion of "occupancy" of a spatial subdivision or cell. A raw set of points is input and used to produce an indexed version on disk (e.g., using a PCG [point cloud grid] file format) to store the data for efficient disk access.

The occupancy metric is an estimation of surface area contribution, hence informational content, of a spatial subdivision. The surface area contribution provides a relative weight to a subdivision cell in terms of the number of points to be contributed from the cell. Surface area contribution is combined with techniques to distribute points within a cell—so that when more points from a cell are read sequentially from disk—it provides an increasingly high resolution rendering, uniformly increasing in density throughout the scene. A specific example of distributing points with this property is described—using randomization of points.

Embodiments of the invention yield image quality comparable to some of the specialized rendering packages, while being substantially faster than other indexing schemes including up to 8 times faster in some cases.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1A:
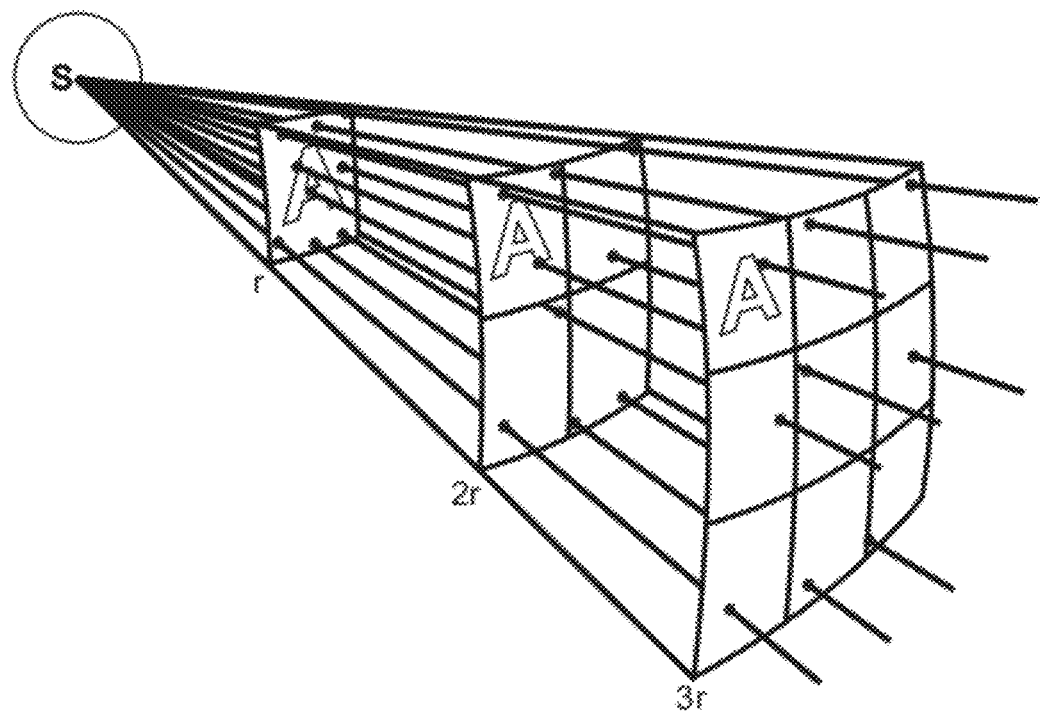
FIGS. 1A and 1B illustrate the halo effect caused by prior art solutions.
Figure 1B:
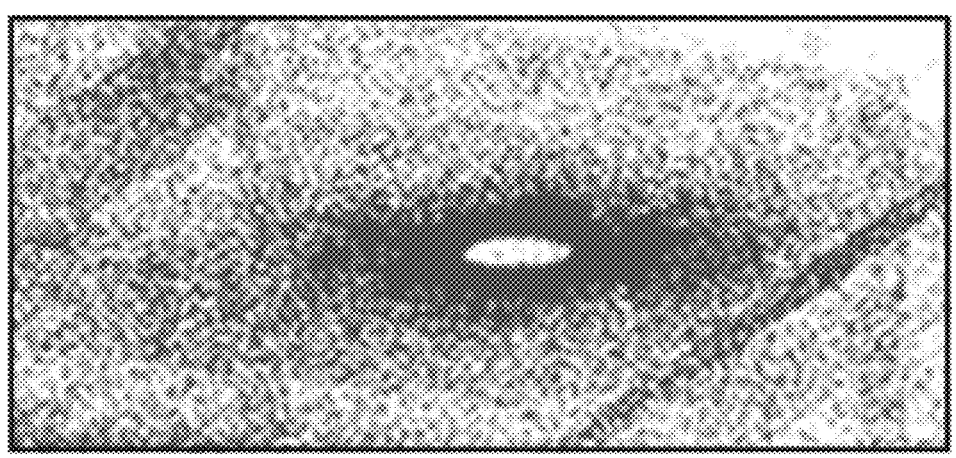
Figure 2:
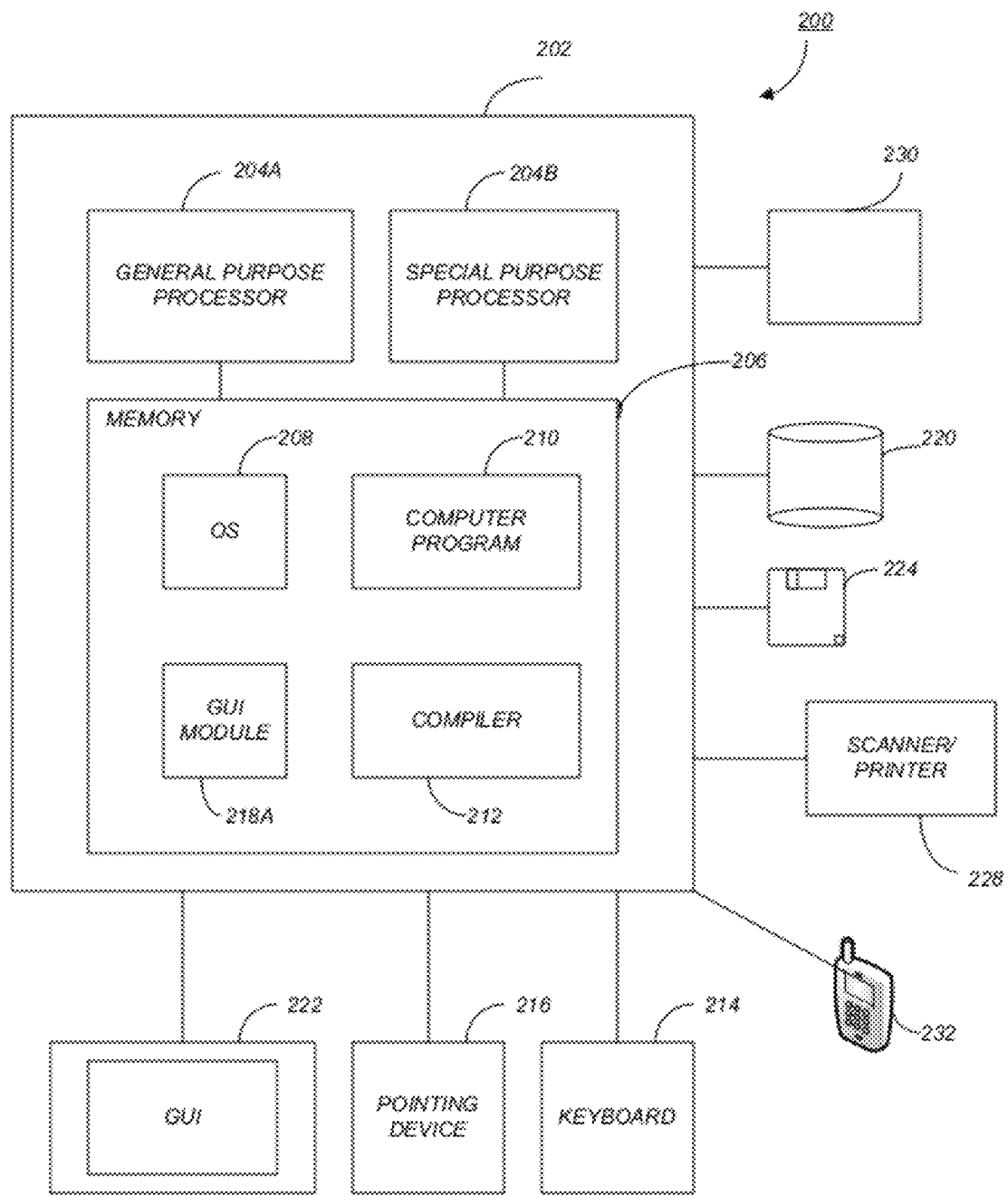
FIG. 2 is an exemplary hardware and software environment used to implement one or more embodiments of the invention.

FIG. 2 is an exemplary hardware and software environment 200 used to implement one or more embodiments of the invention. The hardware and software environment includes a computer 202 and may include peripherals. Computer 202 may be a user/client computer, server computer, or may be a database computer. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a cursor control device 216 (e.g., a mouse, a pointing device, pen and tablet, etc.) and a scanner/printer 228. In one or more embodiments, computer 202 may be coupled to a media viewing/listening device 232 (e.g., an MP3 player, iPod™, Nook™, portable digital video player, cellular device, personal digital assistant, etc.).

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208 to provide output and results.

Output/results may be presented on the display 222 or provided to another device for presentation or further processing or action. In one embodiment, the display 222 comprises a liquid crystal display (LCD) having a plurality of separately addressable liquid crystals. Each liquid crystal of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 210 instructions may be implemented in a special purpose processor 204B. In this embodiment, the some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, Pascal, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers 202.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" or "client computer" is referred to herein, it is understood that a user computer 202 may include portable devices such as cell phones, notebook computers, pocket computers, or any other device with suitable processing, communication, and input/output capability.

Figure 3:
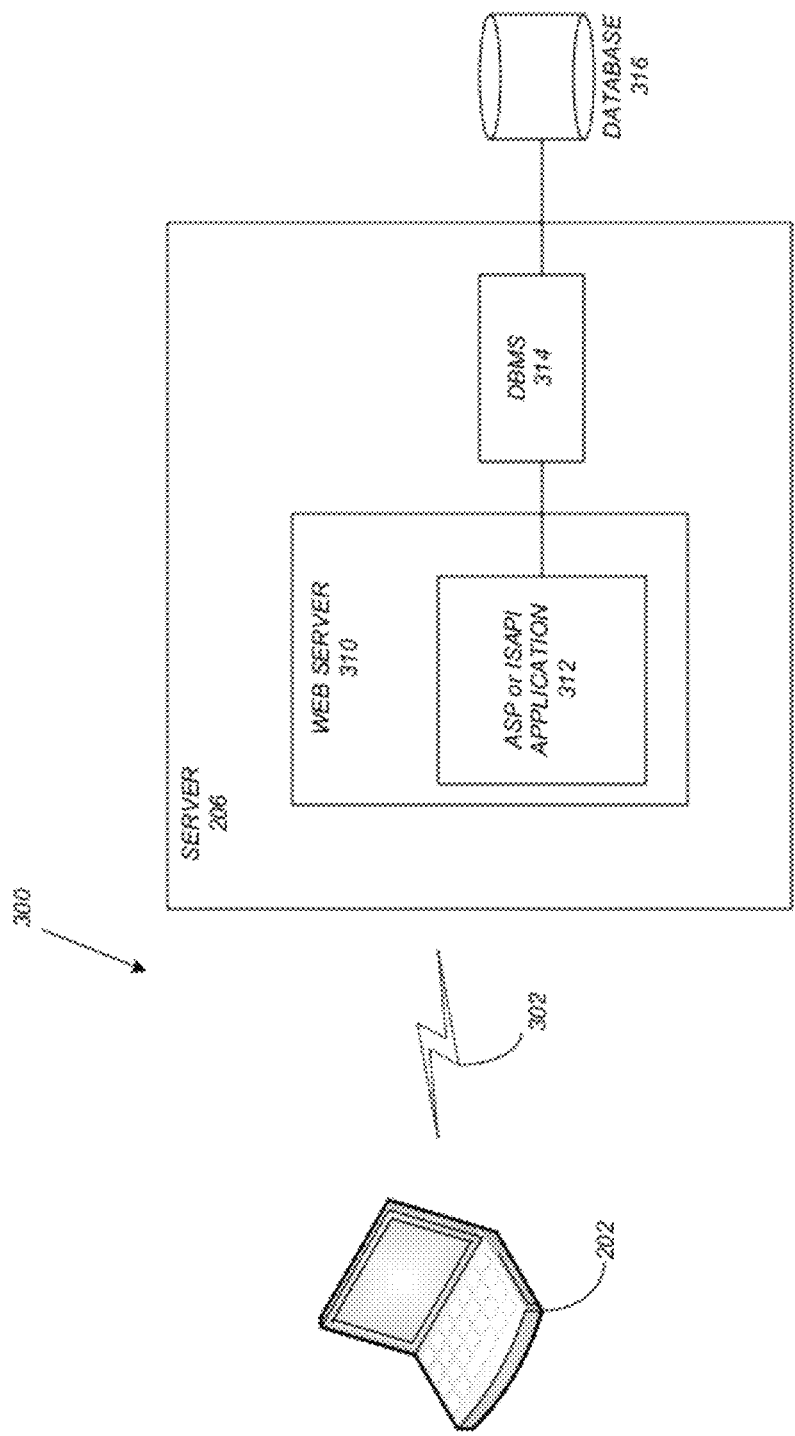
FIG. 3 schematically illustrates a typical distributed computer system using a network to connect client computers to server computers in accordance with one or more embodiments of the invention.

FIG. 3 schematically illustrates a typical distributed computer system 300 using a network 302 to connect client computers 202 to server computers 306. A typical combination of resources may include a network 302 comprising the Internet, LANs (local area networks), WANs (wide area networks), SNA (systems network architecture) networks, or the like, clients 202 that are personal computers or workstations, and servers 306 that are personal computers, workstations, minicomputers, or mainframes (as set forth in FIG. 2).

A network 302 such as the Internet connects clients 202 to server computers 306. Network 302 may utilize ethernet, coaxial cable, wireless communications, radio frequency (RF), etc. to connect and provide the communication between clients 202 and servers 306. Clients 202 may execute a client application or web browser and communicate with server computers 306 executing web servers 310. Such a web browser is typically a program such as MICROSOFT INTERNET EXPLORER™, MOZILLA FIREFOX™, OPERA™, APPLE SAFARI™, etc. Further, the software executing on clients 202 may be downloaded from server computer 306 to client computers 202 and installed as a plug in or ACTIVEX™ control of a web browser. Accordingly, clients 202 may utilize ACTIVEX™ components/component object model (COM) or distributed COM (DCOM) components to provide a user interface on a display of client 202. The web server 310 is typically a program such as MICROSOFT'S INTERNENT INFORMATION SERVER™.

Web server 310 may host an Active Server Page (ASP) or Internet Server Application Programming Interface (ISAPI) application 312, which may be executing scripts. The scripts invoke objects that execute business logic (referred to as business objects). The business objects then manipulate data in database 316 through a database management system (DBMS) 314. Alternatively, database 316 may be part of or connected directly to client 202 instead of communicating/obtaining the information from database 316 across network 302. When a developer encapsulates the business functionality into objects, the system may be referred to as a component object model (COM) system. Accordingly, the scripts executing on web server 310 (and/or application 312) invoke COM objects that implement the business logic. Further, server 306 may utilize MICROSOFT'S™ Transaction Server (MTS) to access required data stored in database 316 via an interface such as ADO (Active Data Objects), OLE DB (Object Linking and Embedding DataBase), or ODBC (Open DataBase Connectivity).

Generally, these components 308-318 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 202 and 306 may include portable devices such as cell phones, notebook computers, pocket computers, or any other device with suitable processing, communication, and input/output capability.

Of course, those skilled in the art will recognize that any combination of the above components, or any number of different components, peripherals, and other devices, may be used with computers 202 and 306.

Software Embodiment Overview

Embodiments of the invention are implemented as a software application on a client 202 or server computer 306. At least one or more of the following three elements are used to provide a uniform distribution/decimation of large point clouds in accordance with one or more embodiments of the invention: (1) Surface area estimation—with cell occupancy as one implementation of estimating it; (2) downsampling; and (3) a successive space filling distribution of points—with randomization of points as one method of achieving that. A brief introduction of each element will follow with a detailed description of each element and a methodology that utilizes the different elements.

The cell occupancy determination is a metric that is used to determine the relative contribution (fraction) of points to read from a particular cell. Embodiments of the invention break up a volume/cell into subcells and use the notion that if a subcell has at least one point from the scan, it is considered occupied. The number of occupied subcells are accumulated to provide an estimate of surface area contribution to the cell. Accordingly, the notion of cell occupancy enables a simple, consistent, and quick determination of the surface area contribution for a particular cell. The surface area contribution can be used as a metric to determine the number of points to use/read from a cell. In other words, if one cell has one million points and another cell as two million points, cell occupancy is used do estimate the surface area contribution of that cell while eliminating the "halo" effect and providing uniformity/normalization across the cells. If the cells can be normalized with a contribution factor between zero (0) and one (1), the number of points to be selected can be based on such a contribution factor. Embodiments of the invention provide the ability to determine such a contribution factor based on the notion of cell occupancy.

Downsampling is used to account for the sparseness of point distribution based on the distance from the scanner. In this regard, as the point lies further from the scanner source, a coarser subgrid results. However, closer to the scanner source, the point distribution is denser. One or more embodiments of the invention perform downsampling to reduce the resolution in subgrids/subcells from a high resolution to a lower/coarser resolution (e.g., from 256 to 128 bits).

The randomization of points provides the ability to store the points in a grid in a random manner so as to evenly distribute the retrieval of the points for a cell. To better understand this concept, background information regarding the storage of points may be useful. Indexed files may be represented on disk as a 3D grid of uniform sized cells. Points within a cell are sequential on disk. Thus, when retrieving/reading/querying a cell, and to avoid lengthy disk operations, points are merely read in the sequential order in which they are stored. Traditionally, such points may merely be stored in the order in which they are scanned. Embodiments of the invention randomize the order in which the points are stored such that when the points are subsequently read (in the sequential order they are stored in), random points from the cell are retrieved. Such randomization enables a point retrieval that provides an even contribution to the details of the scene.

Software Embodiment Details

As used herein, the term "cell" defines an element in a main 3D grid of equal sized rectangular cells that is how points are spatially organized on disk. Further, a cell is the unit that can be spatially queried from a file containing the point cloud data.

The term "subcell" is used for the runtime processing algorithm, where the "cell" is further divided into finer cells for purposes of determining the occupancy metric, and randomizing points within a cell, as will become clearer below.

Occupancy

There are two key challenges in trying to achieve a uniform point distribution:
 a) Intra-Cell point distribution. How are points within a cell organized on disk so as to achieve a uniform distribution when read sequentially—randomizing the points within a cell being one method to achieve this; and
 b) Inter-Cell consistency. How is the right number of points retrieved from cells so as to provide sufficient detail, and not overemphasize some cells.

To achieve intra-cell point distribution, in one implementation, points are randomized as described in more detail below.

To achieve inter-cell consistency, one or more embodiments of the invention uses a metric to capture surface area/information content of a cell—and utilizes the notion of "occupancy" as a method to achieve this. One key insight for determining occupancy is to view the scanning process as capturing surface areas. Thus, one may view occupancy as estimating the surface area contribution from within a cell. Such a surface area contribution correlates to the relative informational content of a cell.

In order to estimate the surface area contribution, one may hypothetically analyze a surface intersecting a (256×256×256) grid of subcells of a cell. The number of subcells intersected provides an estimation of the surface area.

The term "subcells" may be used at two resolutions for two different purposes. One subcell and resolution is the finest 256×256×256 level used for occupancy calculation. The other subcell and resolution is the coarser 16×16×16 resolution for point randomization within a cell.

Since a scan consists of discrete points, determining if a subcell intersects with a surface may be equivalent to determining if a subcell has/contains at least one point. A count of subcells (say an N×N×N subcell grid) divided by N*N to normalize is the "occupancy factor" for a cell. Since we are estimating surface area, the N*N factor normalizes the area contribution taking into account the current subcell resolution. Such an approach ensures that cells with relatively fewer points are given importance based on the number of subcells occupied so that important details are not missed.

If the occupancy of a first cell is 0.8 and a second cell is 0.2 (on a scale of 0-1), then four (4) times as many points should be retrieved, on the average, from first cell as compared to the second cell in order to achieve visual consistency between the cells. Such point retrieval may be achieved by reading sequentially the required number of points from a cell.

Occupancy Accuracy

The natural question is—how accurate a measure is occupancy of the area contribution of the scanned surfaces within a cell.

Figure 4:
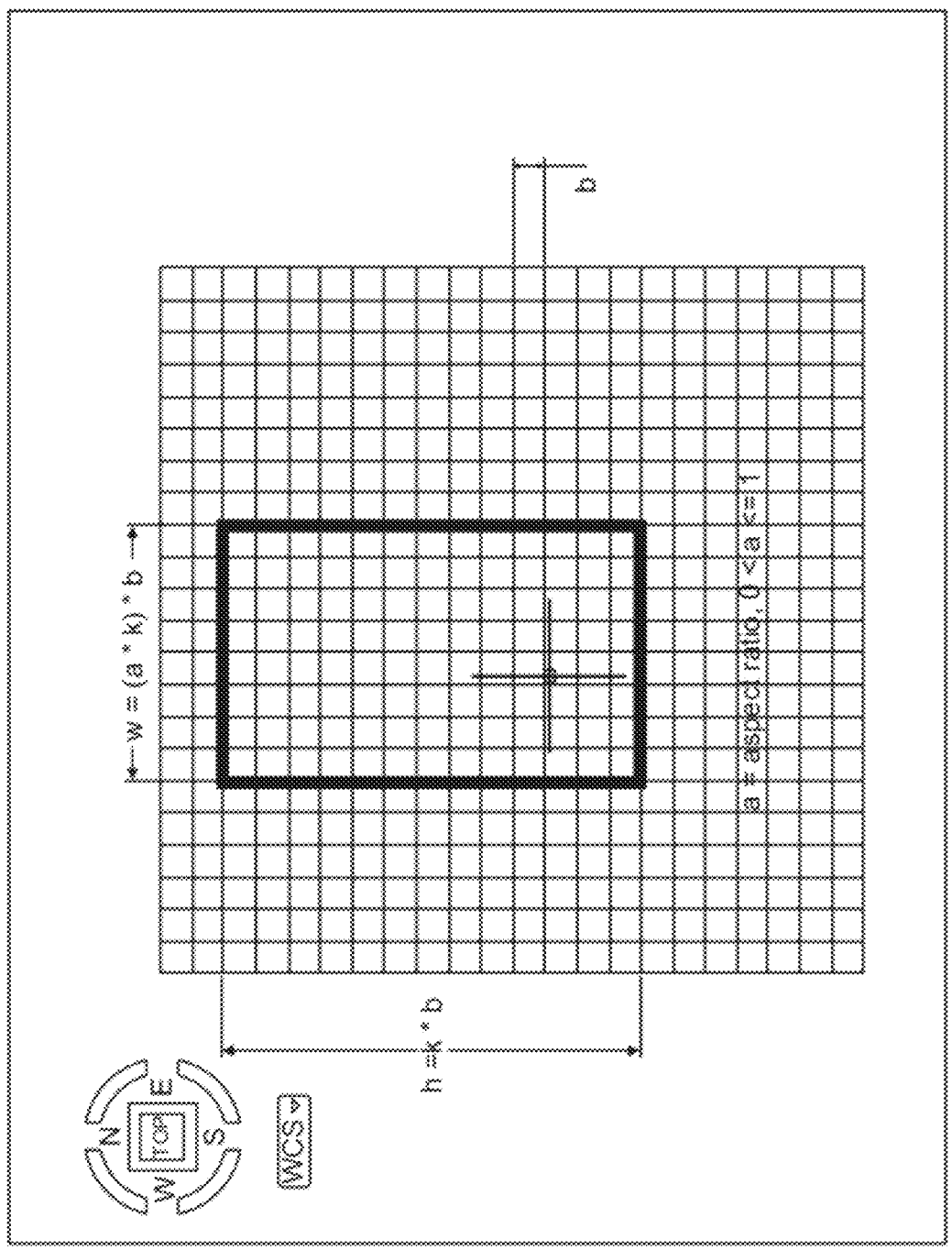
FIG. 4 illustrates a simplified 2D case that illustrates the parameters affecting accuracy of estimation in accordance with one or more embodiments of the invention.
Figure 5:
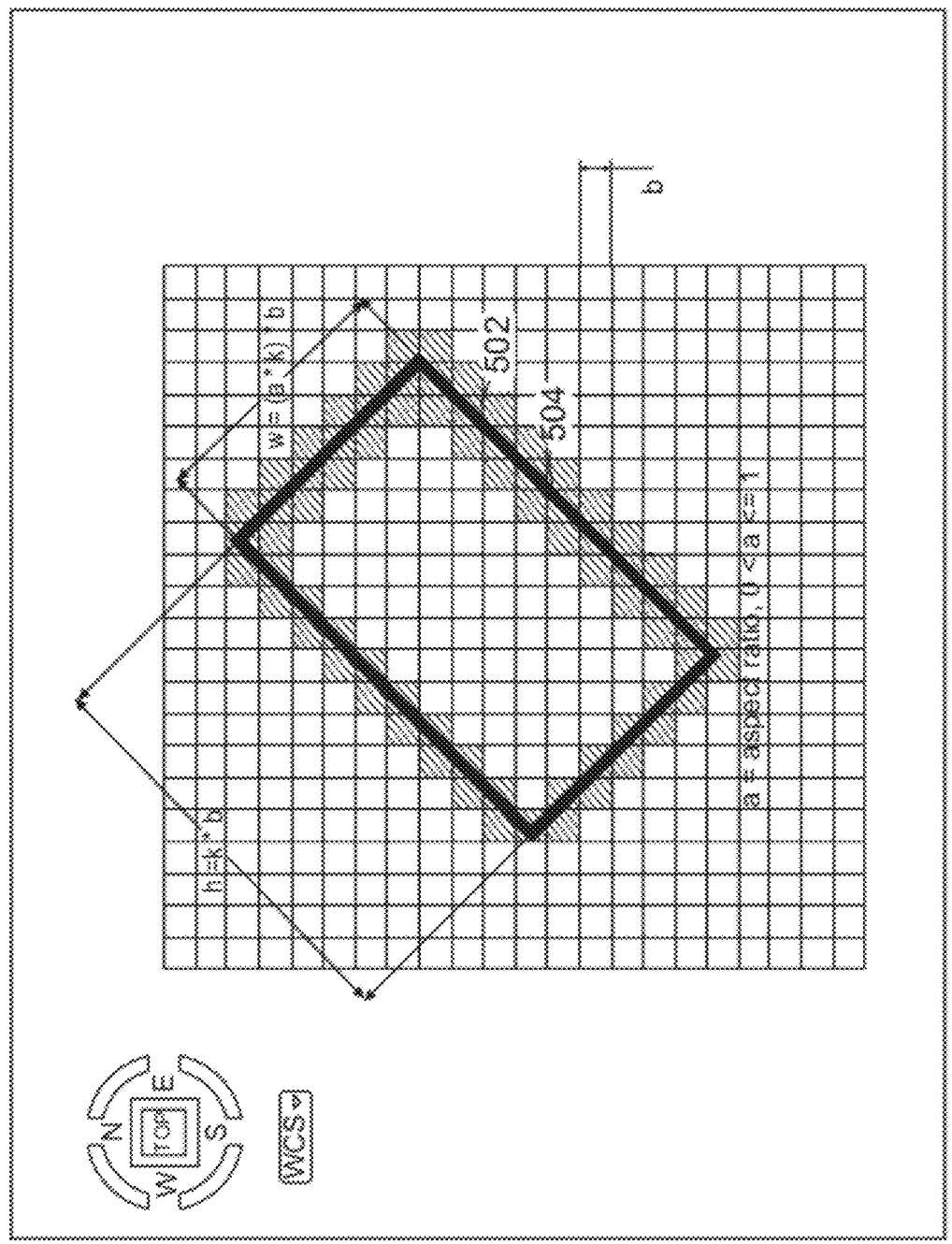
FIG. 5 illustrates a slightly modified 2D case where "edge cells" affect the area computation thereby introducing a potential error in accordance with one or more embodiments of the invention.

FIG. 4 illustrates a simplified 2D case that illustrates the parameters affecting accuracy of estimation in accordance with one or more embodiments of the invention. "b" is the grid cell size, and k*b and (a*k)*b are the dimensions of the rectangle. FIG. 5 illustrates a slightly modified 2D case where "edge cells" 502 affect the area computation thereby introducing a potential error in accordance with one or more embodiments of the invention. As illustrated in FIG. 5, portions of numerous edge cells 502 extend beyond the boundary 504 of the rectangular surface.

For simplicity of argument, if the area of the region is $$\text{area}=h*w=(kb)\cdot(akb)$$

The error can be approximated by the perimeter cells, in the worst case:

$$2(h+w)\cdot b=2kb\cdot b(1+a)$$

In terms of relative error, this would be:

$$\frac{2.k.b.b.\ (1+a)}{a.k.k.b.b}$$

or $$\frac{2}{k}\left(1+\frac{1}{a}\right)$$

What this means is, the error depends on the aspect ratio of the rectangle, and the relative size of the rectangle, relative to the grid cell size. One may question how the error relates to the optimality of visual representation. The accuracy of area estimation (i.e. occupancy) determines the optimality of the visual representation. The accuracy of the occupancy may be affected by one or more of the following:
 Consistency of scan data. The scan information should be sufficiently dense and uniform—so that a surface region in a cell has sufficient scan points that register occupancy in subcells that intersect the surface. (This may be partially overcome by compensating for quadratic decay of scan by an averaging operator at a coarser resolution—or "downsampling").
 Relative grid size. The cell and subcell grid size should be such that most of the "areas" being captured by the scan are sufficiently large relative to the subcell resolution (so that the factor k in equation above is sufficiently large).

Aspect ratios of objects in the scene may further affect the accuracy of the area estimation through occupancy calculation. Cells with thin objects (smaller value of a in FIG. 4), will tend to contribute a larger relative number of sample points based on relative occupancy values. This will result in areas of the scene with finer details getting more emphasis—which in many cases is desirable. Since the data is displayed on a screen, even a line (which has geometrically zero area) has area as defined by pixel resolution, which offers a practical lower bound for the value of the aspect ratio to be considered in error estimation.

Downsampling

As described above, to account for the sparcity of point distribution as the distance from the scanner increases, downsampling may be performed. In this regard, as the distance from the scanner increases, it is desirable to achieve a subgrid of increasing coarseness. For example, given a 256×256×256 subcell resolution, for dense scans, a reasonable surface approximation can be obtained. However, in some cases for sparser scans, or situations where the scan resolution is less than the grid resolution because of distance from the scanner, an averaging filter may be applied. Typical averaging or noise removal filters in image processing may look at a moving window, and in the downsampling process, look for a certain pixel configuration to determine the downsampled value. Thus, if the scan results in sparse points compared to the resolution, holes in the view may result.

Figure 6B:
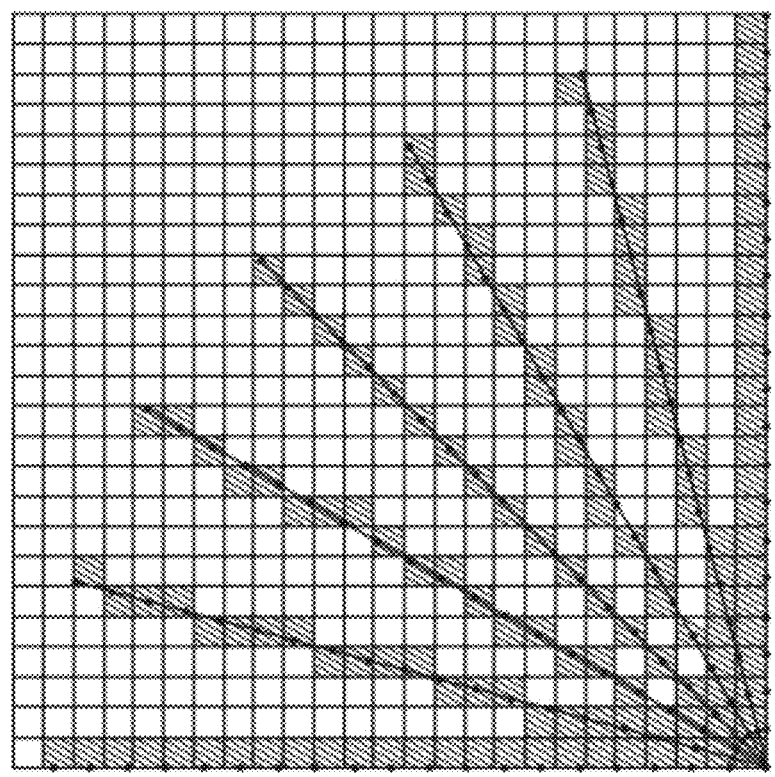
FIGS. 6A and 6B illustrate how downsampling results in a more accurate estimation of surface area in accordance with one or more embodiments of the invention.
Figure 6A:
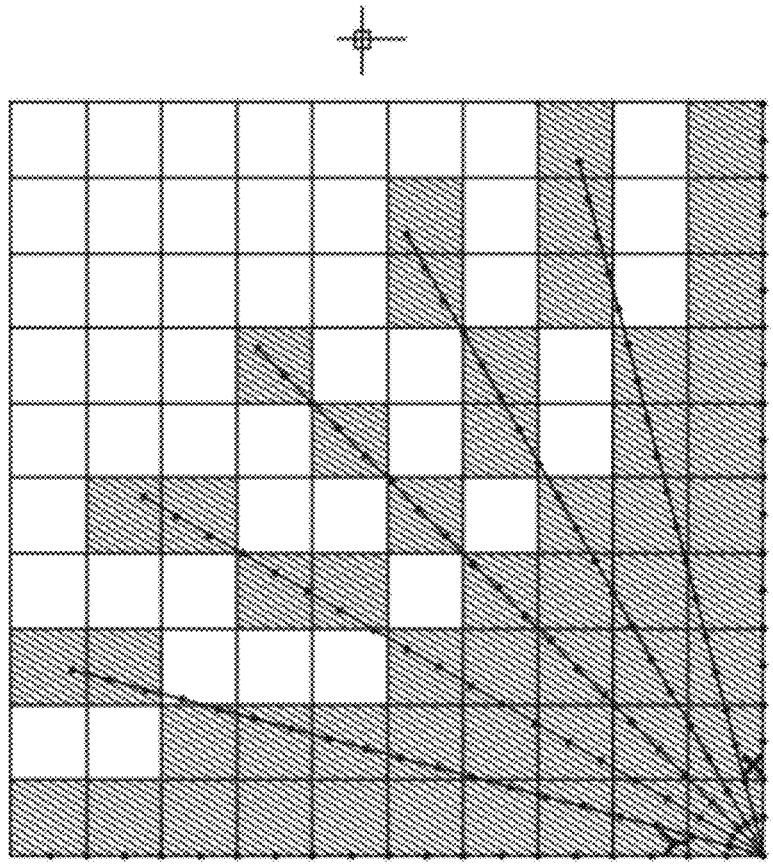

In accordance with embodiments of the invention, the downsampling is performed with respect to the occupancy from above. FIGS. 6A and 6B illustrate how downsampling results in a more accurate estimation of surface area in accordance with one or more embodiments of the invention. FIG. 6A illustrates a coarser (by factor of 2) downsampling. One may note that the "normalized area" (number of cells/N*N) is higher in FIG. 6A compared to that of FIG. 6B (almost 0.5 v/s 0.25—i.e. double).

More specifically, the occupancy of the downsampled image is computed if the change is significant from the higher resolution grid. To perform the downsampling/apply the filter, the resolution may be reduced by a factor of two (2) in each iteration (e.g., evolving from 256×256×256 to 128× 128×128, etc.). A voxel (volumetric pixel) is "set" if any of the pixels in a subgrid/cell is set. Referring again to FIGS. 6A and 6B, the downsampling of the points from FIG. 6B results in the subgrid of FIG. 6A. The shaded areas indicate whether a particular cell is occupied by virtue of containing a point in the subcell. The resulting subgrid of FIG. 6A is more coarse compared to that of the dense/higher resolution subgrid of FIG. 6B.

Figures 7A, 7B:
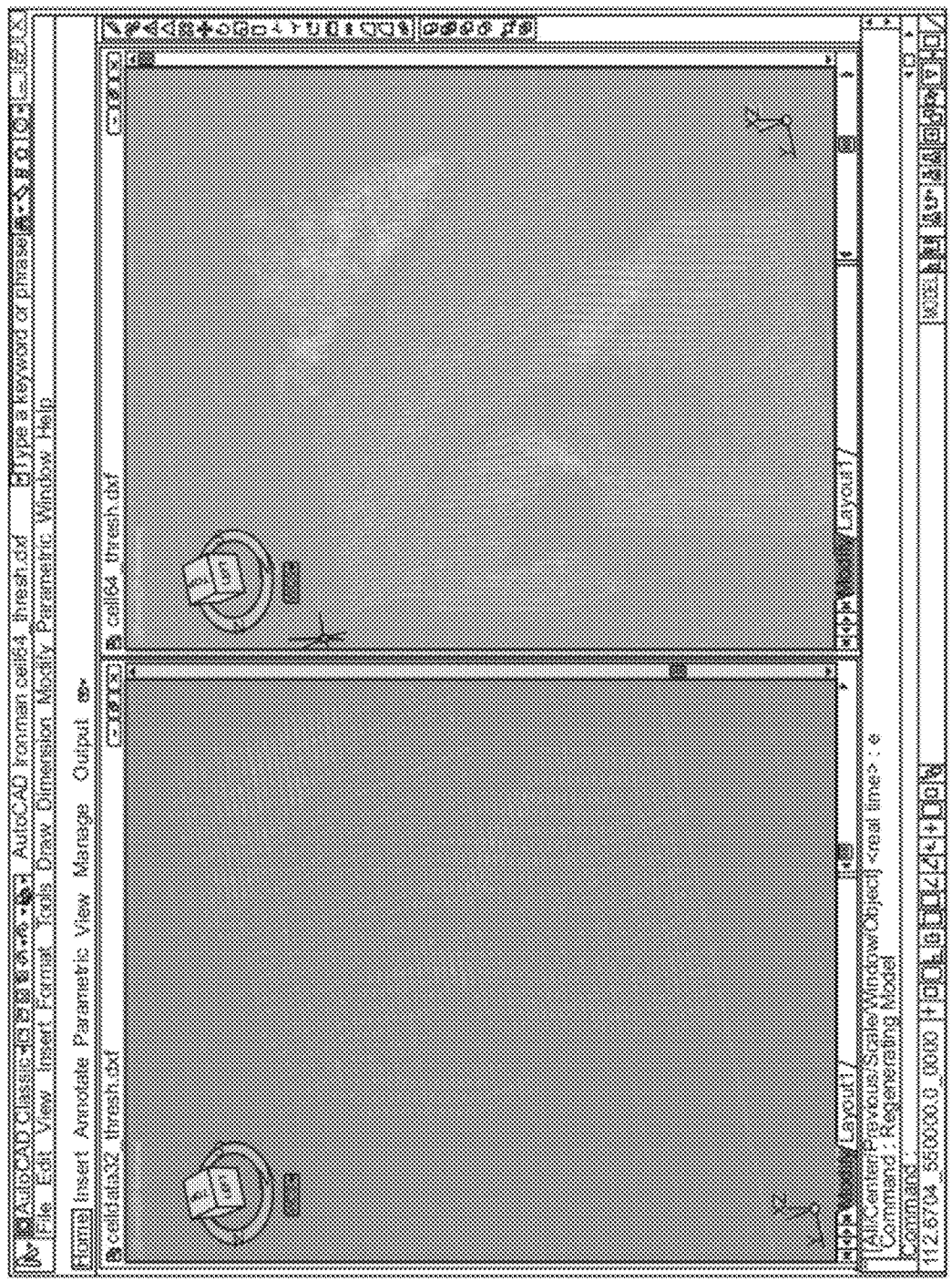
FIG. 7A illustrates a downsampled version of the dense high resolution grid of points of FIG. 7B in accordance with one or more embodiments of the invention.

Often times, a dense grid structure has many holes and is not uniform. Upon filtering/downsampling, the holes (e.g., voids in a surface) may be filled and the grid of points may be more regular. FIG. 7A illustrates a downsampled version of the dense high resolution grid of points of FIG. 7B. As illustrated, holes are filled and the grid structure is coarse and more uniform subsequent to the downsampling.

Randomization of Points

As described above, when points are read from disk, they are read sequentially (no disk seek operations are performed to expedite the processing). If you have a limited number of points to be read, it is desirable to obtain a range of points that are distributed across a volume/region. Embodiments of the invention enable the ability to randomize the points that are read while maintain the sequential read operation.

In order to achieve a distribution of the points read, each cell is divided into a 16×16×16 set of subcells for classification purposes, points are bucketed within these subcells, and points are randomly selected from each of the subcells, and written out to disk—representing a spatially random list of points in the cell.

The following illustrates one method of randomization. If one thinks of a sequential cell numbering scheme (the next sequential cell index is an adjacent cell)—if the indices are bit-reversed and sorted—then—selecting from this sorted sequence results in a maximal spatial (or cell) separation of points. Such a point separation provides a nice "filling in" of points as more points are progressively read from the cell. Table A illustrates a 2D analogy:

TABLE A

| 0  | 1  | 2  | 3  |
|----|----|----|----|
| 7  | 6  | 5  | 4  |
| 8  | 9  | 10 | 11 |
| 15 | 14 | 13 | 12 |

Looking at the bit pattern of sequential indices with the bits reversed:

0000, 1000, 0100, 1100, 0010, . . .

0, 8, 4, 12, 2, . . .

Figure 8:
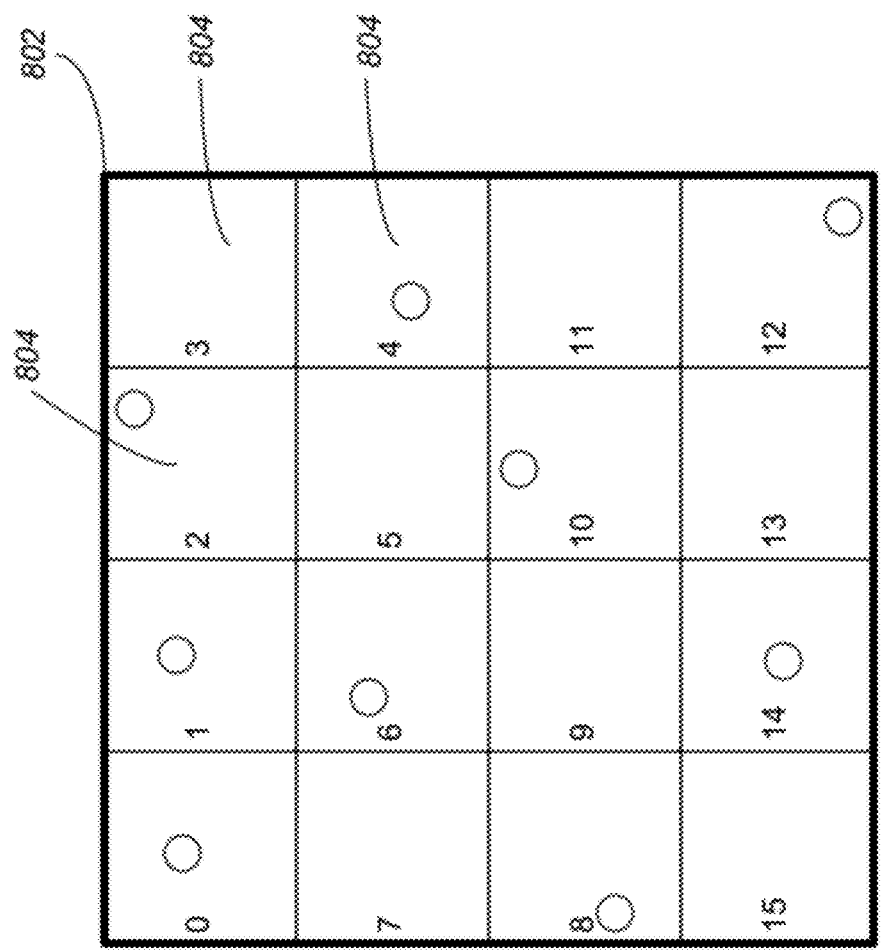
FIG. 8 illustrates a simplified (2D) version of a sub cell grid used in accordance with one or more embodiments of the invention—demonstrating the process of randomizing points.

In other words, by listing individual subcells in sequential order and inverting the bits in the subcell, the points are randomized. Thus, the order in which the points in the cells are stored on disk (for subsequent readout) is randomized. Such randomization results in a good separation between points. While this is one randomization approach—other methods of randomization, e.g. through a random number generator that indicates which subcell to pick, can also applied at this stage. Furthermore, randomizing is just one method of achieving the desired property that points are uniformly distributed, there are more deterministic methods that can be used to achieve the same desired property of points stored on disk. If points are uniformly distributed across cells, a well dispersed distribution that avoids aliasing artifacts results. FIG. 8 illustrates a cell 802 with subcells 804 (1-15). When processing the cell 802, it is desirable to store all of the points in the cell 802 but randomize the storage of the points. Thus, the cell 802 is divided into a grid and points are put into each of the grids/subcells 804. Subcells 804 are picked/selected randomly for the order in which they are stored on disk (e.g., 0, 8, 4, 12, 2, etc.) A random number generator may be used to determine which subcell 804 to store first.

Accordingly, points within a 3D cell are distributed in a random pattern, however, with the property that they have a distribution with successive (random) points that are "far apart". Such a randomization results in the property that as points are sequentially read from the start of the cell, space is populated with a uniformly increasing density, eliminating aliasing or spatial bias artifacts.

Logical Flow

Figure 9:
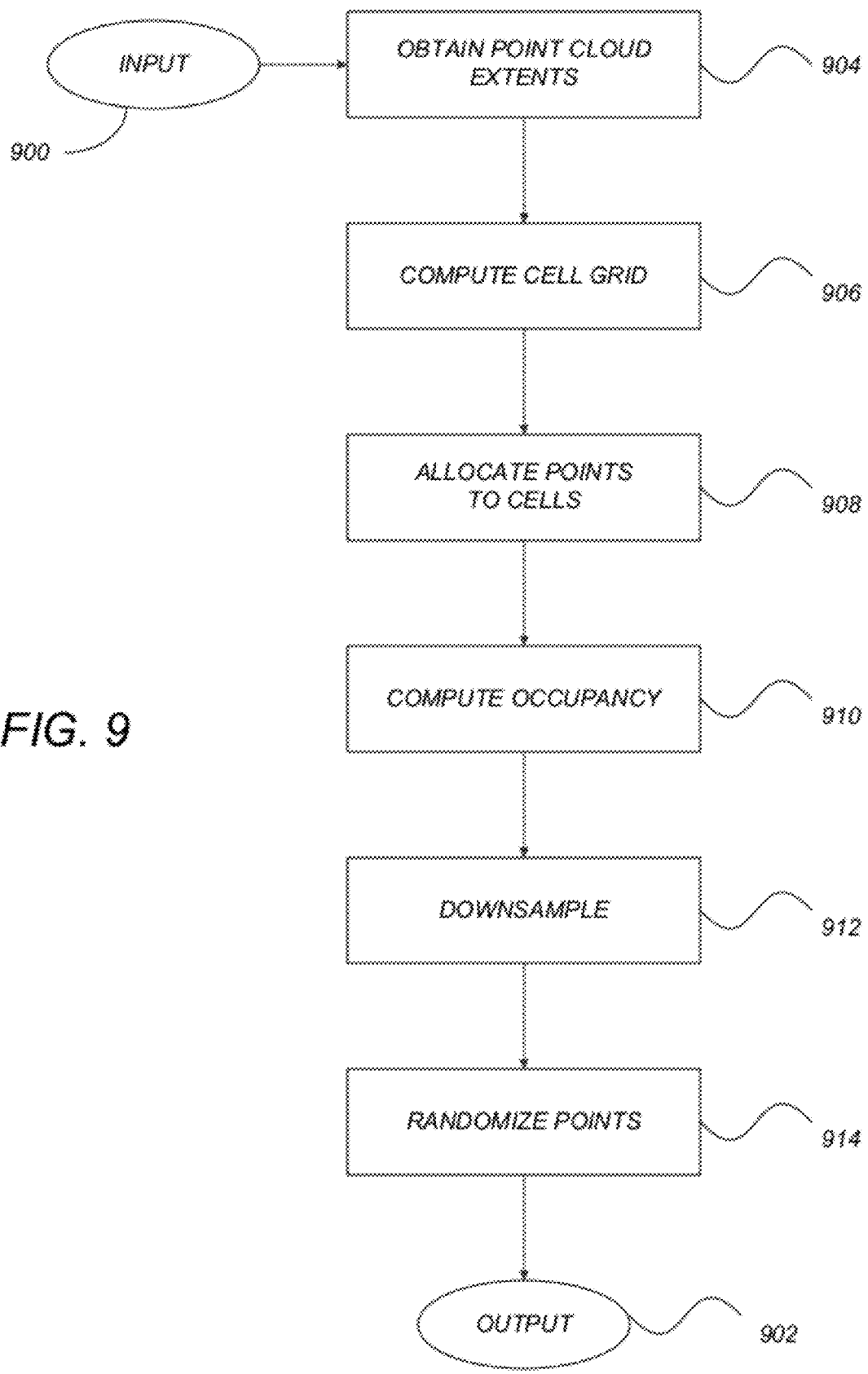
FIG. 9 illustrates the logical flow for creating an occupancy based point cloud indexed file in accordance with one or more embodiments of the invention.

FIG. 9 illustrates the logical flow for creating an occupancy based point cloud indexed file in accordance with one or more embodiments of the invention.

The input 900 is the raw set of points from different raw formats and the output 902 is a point cloud indexed file (e.g., PCG file) that contains points in each cell of the rectangular grid written out to disk sequentially, such that points in each cell are randomized, so that when reading points in, they fill in space progressively.

At step 904, the extents of the point cloud are obtained (e.g., in the form of input 900). The extents may be from the raw format header or a sequential pass of all the points in the raw input data may be conducted.

At step 906, the rectangular grid is defined/computed. The maximum number of points per cell are specified as well as the maximum number of cells. An exemplary value of these settings are three (3) million points per cell and one (1) million cells.

At step 908, points are allocated to cells. For example, a pointlist of the points per cell may be created. Such points can be stored in temporary files if there are a large number of points in the original point cloud. Once the points are allocated, the cell grid is in memory and a pointer to points that contain all the points in the cell has been created/retrieved.

Thus, steps 904-908 provide the ability to map, in a computer, a grid over points in the point cloud dataset where the grid contains one or more cells and each of the cells is divided into one or more subcells. Such a mapping retrieves/obtains the extents of the point loud dataset, defines the grid (by specifying a maximum number of points per cell and maximum number of cells), and allocates the points in the point cloud dataset to the cells.

Figure 10:
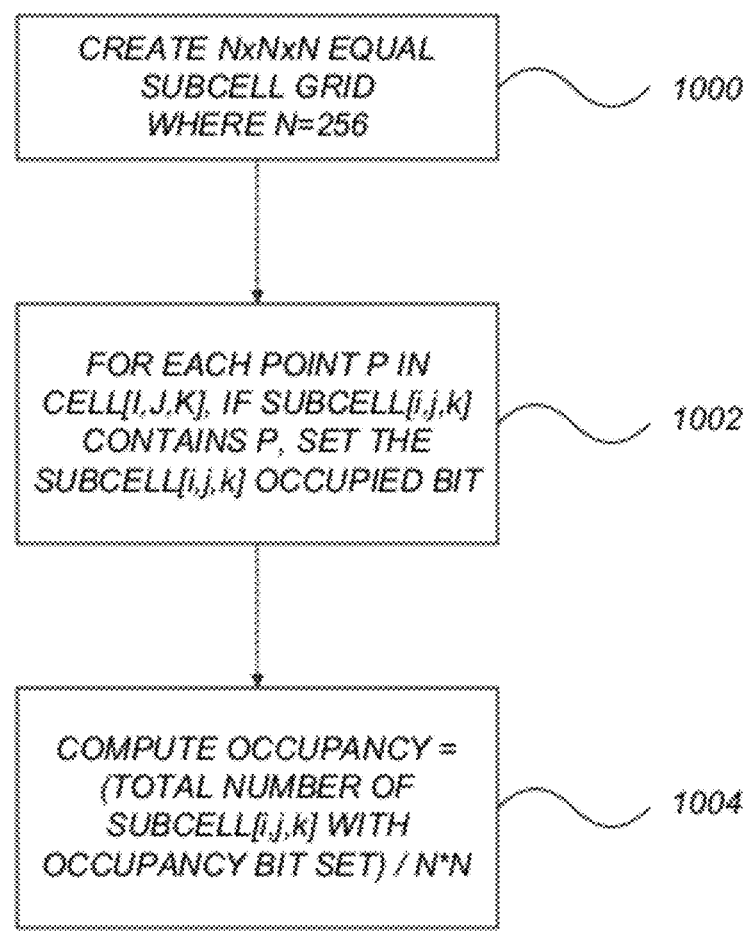
FIG. 10 illustrates the logical flow for the occupancy determination step 910 of FIG. 9 that is performed for each cell in accordance with one or more embodiments of the invention.

At step 910, the occupancy for each cell is computed. The occupancy/occupancy value indicates that a subcell is occupied if the subcell contains at least one of the points from the point cloud dataset. FIG. 10 illustrates the logical flow for the occupancy determination step 910 of FIG. 9 that is performed for each cell (referred to as cell[i]) in the grid cell.

At step 1000, an N×N×N equal subcell grid (where N=245) is created.

At step 1002, for each point P in cell[I,J,K], if subcell[i,j,k] contains P, the subcell[i, j, k] occupied bit is set.

At step 1004, the occupancy/surface area contribution factor is computed as the total number of subcells (i.e., subcell [i,j,k] with the occupancy bit set divided by N*N):

$$\text{OCCUPANCY} = \frac{(\text{Total \# of subcell}[i, j, k] \text{ with occupancy bit set})}{N*N}.$$

Accordingly, the surface area contribution factor is computed for each of the cells. The surface area contribution factor is a count of the total subcells that are occupied divided by the total number of subcells.

Figure 11:
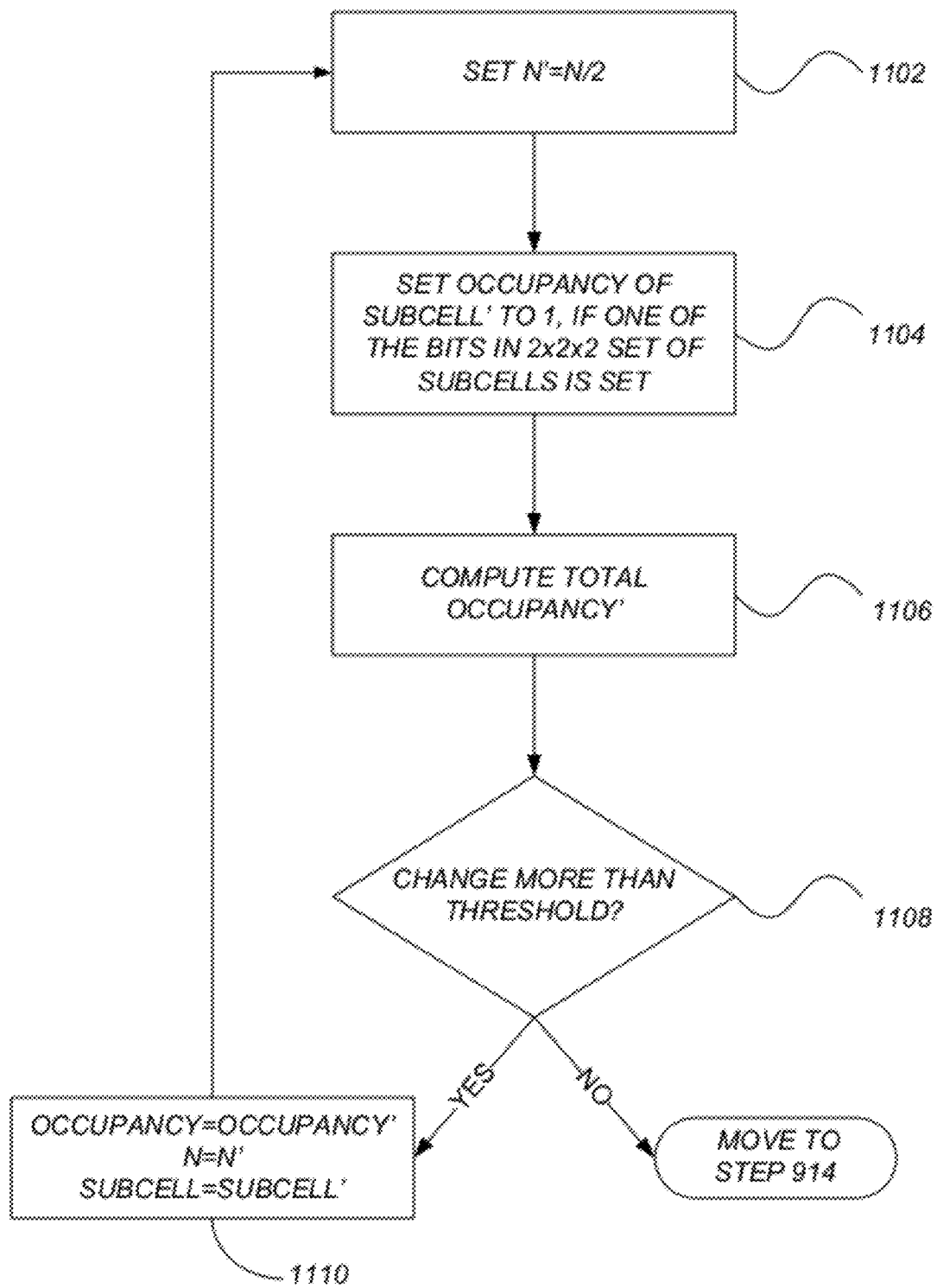
FIG. 11 illustrates the detailed logical flow for downsampling in accordance with one or more embodiments of the invention.

Referring again to FIG. 9, at step 912, downsampling is performed (e.g., when a point cloud dataset resolution is less than a grid resolution). Such a downsampling may reduce the subcell grid resolution by a factor of two (2) for each iteration of downsampling that is performed. FIG. 11 illustrates the detailed logical flow for downsampling in accordance with one or more embodiments of the invention. For each iteration of downsampling (up until a maximum number of iterations), the downsampled occupancy is computed by repeating the steps of FIG. 11.

At step 1102, N' is set equal to N/2.

At step 1104, set subcell'[i,j,k]=1 if one of the bits of subcell[2*i(+1_,2*j(+1),2*k(+1)] is set. In other words, if one of the bits in the 2×2×2 set of cells with the lower corner being subcell[2i,2j,2k] is set, the subcell is set as being occupied.

At step 1106, OCCUPANCY' is set equal to the total number of subcell'[i,j,k] that have the occupancy bit set divided by N'*N':

$$\text{OCCUPANCY}' = \frac{(\text{Total \# of subcell}'[i, j, k] \text{ with occupancy bit set})}{N'*N'}$$

At step 110, a determination is made regarding whether the change to OCCUPANCY' from OCCUPANCY is more than a threshold (i.e., indicating if a downsampling was needed). If the threshold is exceeded, the prime values are utilized (i.e., OCCUPANCY=OCCUPANCY', N=N', and SUBCELL=SUBCELL') and another downsamping iteration begins at step 1102.

If the threshold is not exceeded (i.e., another downsampling iteration is not needed), processing continues in FIG. 9 with step 914.

Figure 12:
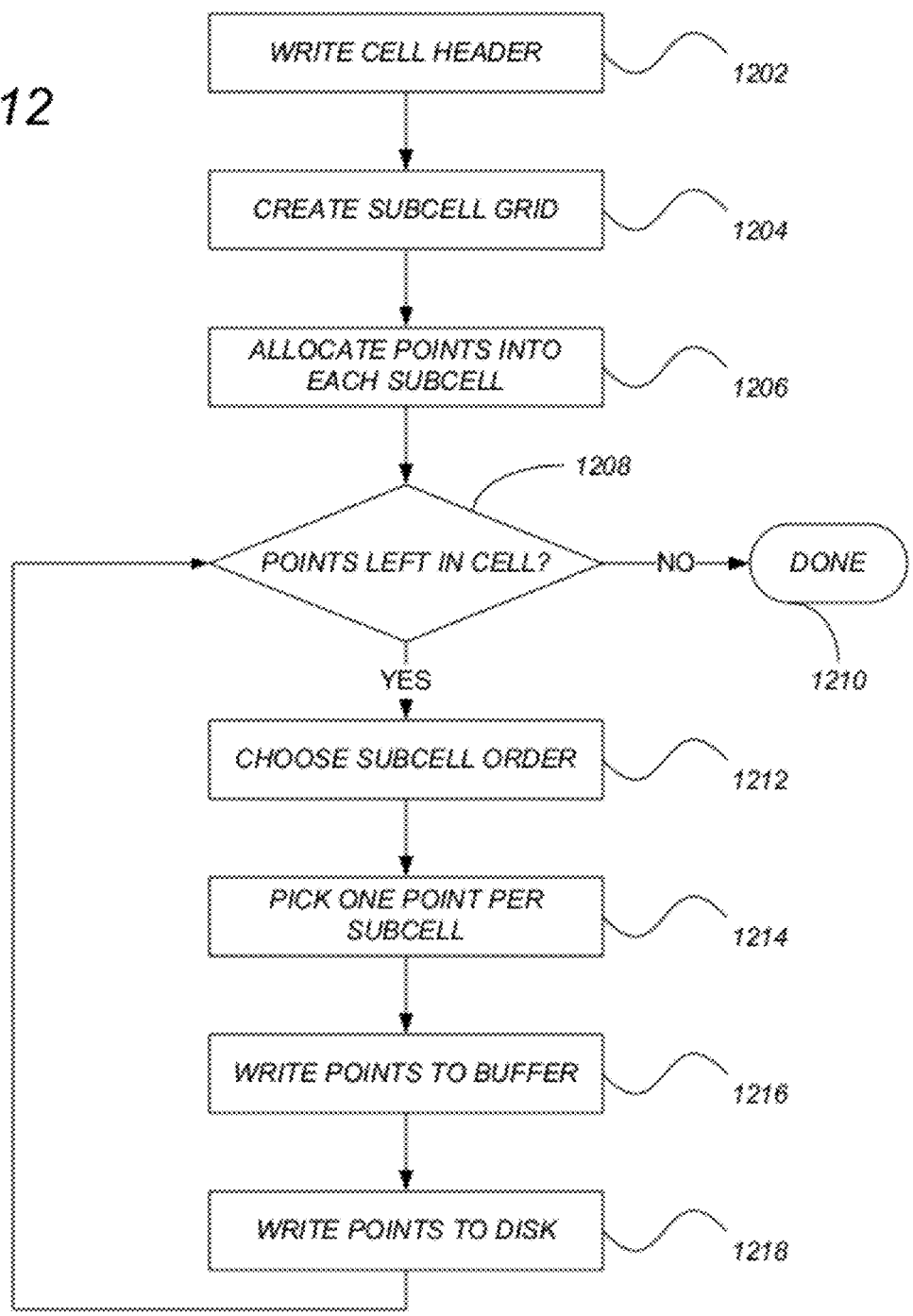
FIG. 12 illustrates the logical flow for writing/outputting points to a file/disk in accordance with one or more embodiments of the invention.

Referring to FIG. 9, once step 912 has been completed, sufficient downsampling has been performed as necessary to compute the occupancy factor and the occupancy has been calculated per cell. Accordingly, at step 914, the points are randomized and the cell contents are written to disk. For each cell[i] in the cell grid, the steps of FIG. 12 are performed.

At step 1202, the cell OCCUPANCY and point count are written as a cell header in the output file.

At step 1204, an N×N×N subcell grid is created (where N=16).

At step 1206, points are allocated from cell[i] into each of the subcells.

At step 1208, a determination is made if there are points left in cell[i]. If not, the process is complete at step 1210. In other words, steps 1212-1218 are performed while there are points left in cell[i].

At step 1212, an order of subcells spanning the full range of non-empty subcells in the 16×16×16 set of subcells are randomly chosen.

At step 1214, one point per subcell is picked/selected.

At step 1216, the picked points are written to a buffer.

At step 1218, when the buffer is full or a threshold is reached, the points are written to disk. The layout of the data as written on disk is:

[Cell1 Header: Occupancy, Point Count, Offset to point list1],

[Cell2 Header: Occupancy, Point Count, Offset to point list2],

. . .

[CellN Header: Occupancy, Point Count, Offset to point listN]

[Cell1 Randomized Point list],

[Cell2 Randomized Point list],

. . .

[CellN Randomized Point list],

Thus, both the surface area contribution factor and a set of points are written to a point cloud indexed file. The writing includes (for each cell) a cell header that includes the surface area contribution factor for that cell and the total cell point count for that cell. Lastly, as described above using random subcell ordering to pick points sequentially, points within a cell are written to disk in a random order.

Accordingly, the process performed as described with respect to FIGS. 9-12 provides for performing several passes through the point cloud data set. In the first pass, the points are sequentially read and allocated into cells. Such a pass results in a cell grid in memory and a pointer to a list of points in the cell. The first pass also determines the total volume of space occupied by the points and the total number of points in the point cloud.

In the second pass, the cells are processed cell by cell. The cell is divided into subcells and all of the points associated with the cell being examined are sequentially read. As each point is read, based on the extents of the cell and the coordinate values of the point, the subcell location for a point can be quickly and efficiently determined. If a point lies in a particular subcell, an "occupied" bit is set for that subcell. Thus, as the set of points for a cell are processed, the occupancy bits corresponding to the subcells are set. Thereafter, a downsampling pass may be performed to obtain a downsampled version of the occupancy bits. Finally, randomization may be performed where random values of the subcells are selected and used to write the points out to a buffer or temporary file that is then written out to disk as part of the PCG file.

Once the data is stored on disk, embodiments of the invention may further provide for reading/using the file. Thus, the point cloud indexed file may be obtained. Thereafter, based on the surface area contribution factor (from the cell header), the number of points to read for a cell is determined. The specified number of points may then be read and displayed on a display device.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Further, embodiments of the invention provide a very low overhead, platform independent solution that can scale from small handheld systems to large server bases systems with multi-billion point capabilities.

As a result of the above described embodiments, the ability to store and read points for large point cloud data sets may provide processing times two times that of prior art methods. Thus, embodiments of the invention are useful when rapid quality indexing is needed and may be implemented in a highly parallelizable and incremental method (e.g., in an editing application).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Rixio Morales, Yunhong Wang, Zhaoxiang "Unstructured Point Cloud Surface Denoising and Decimiation using RBF K-Nearest Neighbor Kernel" Advances in Multimedia Information Processing, Lecture Notes in Computer Science, 2011 Vol. 6298/2011 pp 214-225 DOI: 10.1007/978-3-642-15696-0_20.
[2] Zhigiang Du, Qiaoxiong Li "A new method of storage and visualization for massive point cloud dataset" $22^{nd}$ CIPA Symposium, Oct. 11-15, 2009 Kyoto, Japan.
[3] Hui Huang, Dan Li Hao Zhang Uri Ascher "Consolidation of Unorganized Point Clouds for Surface Reconstruction" ACM SIGGRAPH Asia 2009, Article No.: 176, 10.1145/1661412.1618522.
[4] J. Manson, G. Petrova, S. Schaefer "Streaming Surface Reconstruction UsingWavelets" Eurographics Symposium on Geometry Processing 2008 Pierre Alliez and Szymon Rusinkiewicz (Guest Editors) Volume 27 (2008), Number 5.

What is claimed is:

1. A computer implemented method for creating a point cloud indexed file comprising:
   (a) mapping, in a computer, a grid over one or more points in a point cloud dataset, wherein:
      (i) the grid comprises one or more cells; and
      (ii) each of the one or more cells is divided into one or more subcells;
   (b) computing an occupancy value for each of the one or more subcells, wherein the occupancy value comprises a bit that indicates a subcell is occupied if the subcell contains at least one of the one or more points;
   (c) computing a surface area contribution factor for each of the one or more cells, wherein the surface area contribution factor comprises an occupied count of subcells in each cell that are occupied divided by a total subcell number of the one or more subcells in that cell; and
   (d) writing the surface area contribution factor for each of the one or more cells and one or more of the one or more points to the point cloud indexed file in a random order.

2. The method of claim 1, wherein the mapping comprises:
   obtaining extents of the point cloud dataset;
   defining the grid, wherein the defining comprising specifying a maximum number of points per cell and a maximum number of cells; and
   allocating the one or more points to the one or more cells.

3. The method of claim 1, further comprising downsampling the surface area contribution factor when a point cloud dataset resolution is less than a grid resolution.

4. The method of claim 3, wherein the downsampling comprises reducing the surface area contribution factor by a factor of two (2) for each of one or more iterations of the downsampling.

5. The method of claim 1, wherein the one or more of the one or more points that are written to the point cloud indexed file comprise a maximum of one point per subcell.

6. The method of claim 1, wherein the writing comprises:
   (a) for each of the one or more cells:
      (i) writing, to a cell header, the surface area contribution factor and a total cell point count for a corresponding cell;
      (ii) randomly choosing an order of the one or more subcells that are not empty; and
      (iii) writing one point per subcell in the random order to disk.

7. The method of claim 1, further comprising:
   obtaining the point cloud indexed file;
   determining, based on the surface area contribution factor, a number of points to read for each of the one or more cells;
   reading, from the point cloud indexed file, the number of points; and
   displaying the read number of points on a display device.

8. An apparatus for creating a point cloud indexed file in a computer system comprising:
   (a) a computer having a memory;
   (b) an application executing on the computer, wherein the application is configured to:
      (i) map a grid over one or more points in the point cloud dataset, wherein:
         (1) the grid comprises one or more cells; and
         (2) each of the one or more cells is divided into one or more subcells;
      (ii) compute an occupancy value for each of the one or more subcells, wherein the occupancy value comprises a bit that indicates a subcell is occupied if the subcell contains at least one of the one or more points;
      (iii) compute a surface area contribution factor for each of the one or more cells, wherein the surface area contribution factor comprises an occupied count of subcells in each cell that are occupied divided by a total subcell number of the one or more subcells in that cell; and
      (iv) write the surface area contribution factor for each of the one or more cells and one or more of the one or more points to the point cloud indexed file in a random order.

9. The apparatus of claim 8, wherein the application is configured to map by:
 obtaining extents of the point cloud dataset;
 defining the grid, wherein the defining comprising specifying a maximum number of points per cell and a maximum number of cells; and
 allocating the one or more points to the one or more cells.

10. The apparatus of claim 8, wherein the application is further configured to downsample the surface area contribution factor when a point cloud dataset resolution is less than a grid resolution.

11. The apparatus of claim 10, wherein the application downsamples by reducing the surface area contribution factor by a factor of two (2) for each of one or more downsample iterations.

12. The apparatus of claim 8, wherein the one or more of the one or more points that are written to the point cloud indexed file comprise a maximum of one point per subcell.

13. The apparatus of claim 8, wherein the application is configured to write by:
 (a) for each of the one or more cells:
  (i) writing, to a cell header, the surface area contribution factor and a total cell point count for a corresponding cell;
  (ii) randomly choosing an order of the one or more subcells that are not empty; and
  (iii) writing one point per subcell in the random order to disk.

14. The apparatus of claim 8, wherein the application is further configured to:
 obtain the point cloud indexed file;
 determine, based on the surface area contribution factor, a number of points to read for each of the one or more cells;
 read, from the point cloud indexed file, the number of points; and
 display the read number of points on a display device.

15. A non-transitory computer readable storage medium encoded with computer program instructions which when accessed by a computer cause the computer to load the program instructions to a memory therein creating a special purpose data structure causing the computer to operate as a specially programmed computer, executing a method of creating a point cloud indexed file, comprising:
 (a) mapping, in the specially programmed computer, a grid over one or more points in the point cloud dataset, wherein:
  (i) the grid comprises one or more cells; and
  (ii) each of the one or more cells is divided into one or more subcells;
 (b) computing, in the specially programmed computer, an occupancy value for each of the one or more subcells, wherein the occupancy value comprises a bit that indicates a subcell is occupied if the subcell contains at least one of the one or more points;
 (c) computing, in the specially programmed computer, a surface area contribution factor for each of the one or more cells, wherein the surface area contribution factor comprises an occupied count of subcells in each cell that are occupied divided by a total subcell number of the one or more subcells in that cell; and
 (d) writing, in the specially programmed computer, the surface area contribution factor for each of the one or more cells and one or more of the one or more points to the point cloud indexed file in a random order.

16. The non-transitory computer readable storage medium of claim 15, wherein the mapping comprises:
 obtaining, in the specially programmed computer, extents of the point cloud dataset;
 defining the grid, in the specially programmed computer, wherein the defining comprising specifying a maximum number of points per cell and a maximum number of cells; and
 allocating the one or more points to the one or more cells.

17. The non-transitory computer readable storage medium of claim 15, further comprising downsampling, in the specially programmed computer, the surface area contribution factor when a point cloud dataset resolution is less than a grid resolution.

18. The non-transitory computer readable storage medium of claim 17, wherein the downsampling comprises reducing the surface area contribution factor by a factor of two (2) for each of one or more iterations of the downsampling.

19. The non-transitory computer readable storage medium of claim 15, wherein the one or more of the one or more points that are written to the point cloud indexed file comprise a maximum of one point per subcell.

20. The non-transitory computer readable storage medium of claim 15, wherein the writing comprises:
 (a) for each of the one or more cells:
  (i) writing, to a cell header, the surface area contribution factor and a total cell point count for a corresponding cell;
  (ii) randomly choosing an order of the one or more subcells that are not empty; and
  (iii) writing one point per subcell in the random order to disk.

21. The non-transitory computer readable storage medium of claim 15, further comprising:
 obtaining, in the specially programmed computer, the point cloud indexed file;
 determining, in the specially programmed computer, based on the surface area contribution factor, a number of points to read for each of the one or more cells;
 reading, in the specially programmed computer, from the point cloud indexed file, the number of points; and
 displaying, using the specially programmed computer, the read number of points on a display device.

* * * * *